(12) United States Patent
Hollaway

(10) Patent No.: US 6,756,907 B2
(45) Date of Patent: Jun. 29, 2004

(54) MAINTAINANCE SUPPORT SYSTEM FOR AN ELECTRICAL APPARATUS

(76) Inventor: Jerrell Penn Hollaway, 3636 Woodstock Ct., Melbourne, FL (US) 32904

( * ) Notice: Subject to any disclaimer, the term of this patent is extended or adjusted under 35 U.S.C. 154(b) by 145 days.

(21) Appl. No.: 10/166,497

(22) Filed: Jun. 11, 2002

(65) Prior Publication Data

US 2003/0229664 A1 Dec. 11, 2003

(51) Int. Cl.[7] .............................................. G08B 21/00
(52) U.S. Cl. ...................... 340/635; 340/511; 340/3.43; 340/3.44; 700/79
(58) Field of Search ................................ 340/635, 657, 340/660, 664, 511, 521, 517, 522, 500, 501, 3.43, 3.44; 700/282, 83, 17, 10, 79; 307/134, 135, 140; 137/551, 565.01; 361/1, 78, 86, 87

(56) References Cited

U.S. PATENT DOCUMENTS

| | | | | |
|---|---|---|---|---|
| 5,063,516 A | * | 11/1991 | Jamoua et al. ............... | 701/114 |
| 5,512,890 A | * | 4/1996 | Everson et al. ......... | 340/870.13 |
| 5,708,548 A | * | 1/1998 | Greeve et al. ................. | 361/42 |
| 6,253,227 B1 | * | 6/2001 | Tompkins et al. .......... | 709/201 |

* cited by examiner

Primary Examiner—Daniel J. Wu
Assistant Examiner—Phung Nguyen

(57) ABSTRACT

The present invention describes a maintenance support system that can be used to automatically isolate defective components in a complex electrical apparatus. The system includes programming instructions that activate individual components of the electrical operation in a non-operational sequence, while collecting performance data for each tested component. Performance data is provided by existing feedback devices in the apparatus as well as by additional sensors which are a part of the new system. All collected data and available background information are analyzed by programming instructions that consider, among other things, the probability of failure in certain components. The final outcome is a component replacement recommendation on a local or remote computer display that combines the performance data, history, probability and operational knowledge of the apparatus, thereby improving the performance of service personnel.

20 Claims, 1 Drawing Sheet

MAINTAINANCE SUPPORT SYSTEM FOR AN ELECTRICAL APPARATUS

BACKGROUND OF THE INVENTION

1. Field of Invention

The present invention relates to apparatus used to monitor and control the use of electricity in motors, lights, heaters, etc., and, more specifically, controls for spas, hot tubs and swimming pools.

2. Description of Related Art

Electronic controls for spas have been developed which give spa owners many features and conveniences. Unfortunately the difficulty in servicing these products, similar to the modern automobile, has also greatly increased. Even a skilled and experienced technician may have difficulty isolating a defective pump, heater, pressure switch, etc. without extensive testing of the individual components. This is mainly because these components are turned on and off according to a complicated software program in a microprocessor, which the service technician and spa owner may not understand.

Other spa controls, such as the one described in U.S. Pat. No. 6,253,227, Tompkins and Green, show certain error messages on a display that relate to certain system failures, i.e., "FLO", which means lack of water flow. A service technician responding to a "FLO" message would usually have to devise his own scheme for relating this error message to a bad pump, filter element, plumbing blockage, control panel, power switching circuit board, fuse, or even the flow measuring device itself (usually a pressure switch). This is not an easy task and the technician, for his customer's sake, will often just replace everything that he feels could contribute to such an error message.

SUMMARY OF THE INVENTION

The present invention is a major improvement over the previous attempts to provide error messages in that data is collected from various sensors for temperature, time, pressure, light, voltage, current, PH, ORP, etc. over a carefully controlled test cycle where components are turned on and off individually by a power switching means while certain measurements are made by various sensing means, the most important being a current sensor.

After all possible data has been collected from the spa is a first and second state of operation, special failure analysis logic is applied and each component is either validated or condemned as defective, based often on previous conclusions concerning other components. The final result then is a "replacement recommendation" that indicates which part or component needs repair or replacement.

The improvement of the present invention is to replace the aforementioned "error messages" with accurate "replacement recommendations" which lead to action, rather than just status.

DETAILED DESCRIPTION OF THE PREFERRED EMBODIMENT

Figure 1:
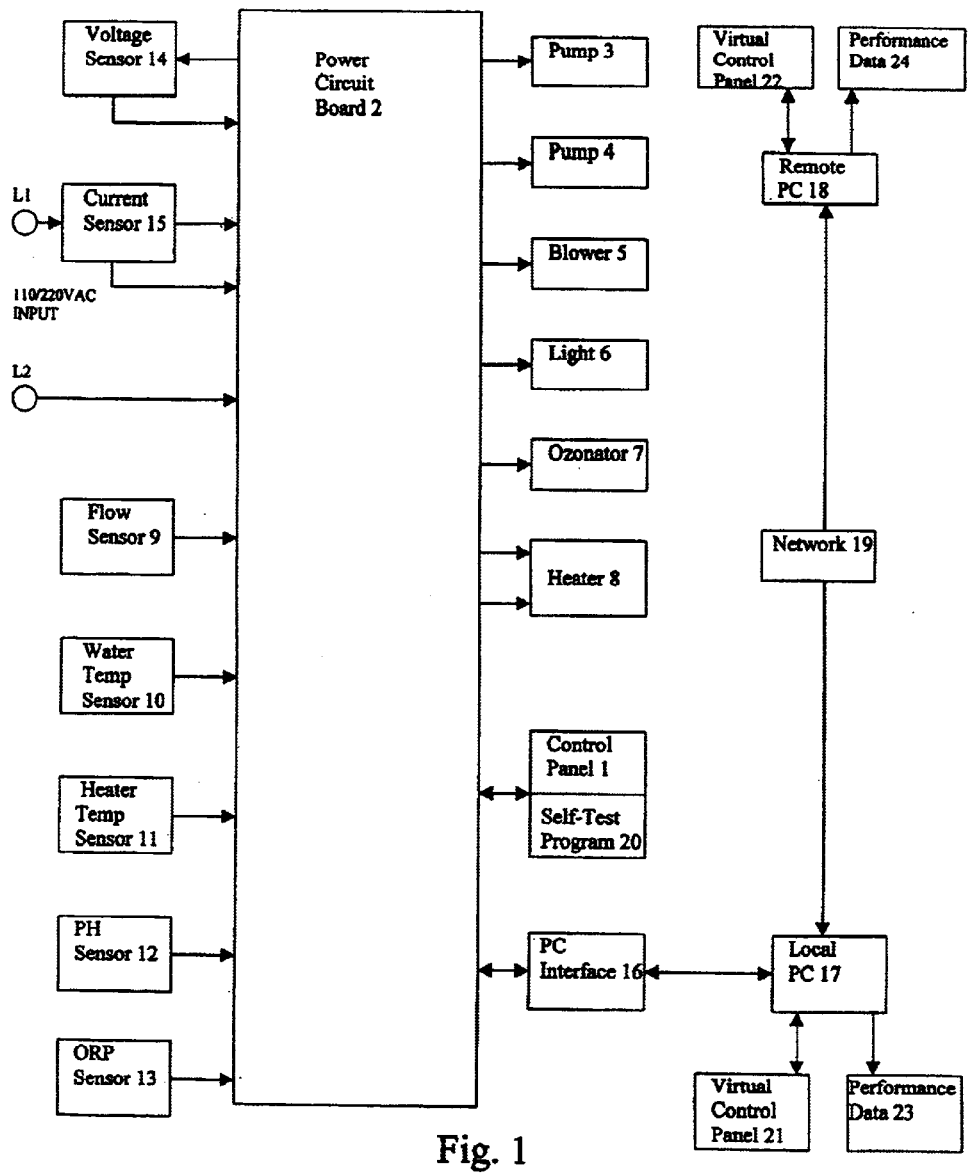
FIG. 1 shows a preferred embodiment of the present invention used in a spa.

Referring to FIG. 1, the regular electrical components of a spa may consist of control panel 1, power circuit board 2, pump 3, pump 4, blower 5, light 6, ozonator 7, heater 8, flow sensor 9, water temp sensor 10, heater temp sensor 11, PH sensor 12, and ORP sensor 13. These components are connected together, in a manner well known in the art, to provide moving hot water to bathers. Control panel 1 is used as a special computer means with added program means to selectively energize and de-energize the various electrical loads.

The additional components of the Maintenance Support System are voltage sensor 14, current sensor 15, pc interface 16, local pc 17, remote pc 18, network 19, and self-test program 20 embedded in control panel 1. Local pc 17 and remote pc 18 may contain special programming to create user interfaces in virtual control panel and virtual control panel 22 and to display performance data from the spa in performance data 23 and performance data 24.

Voltage sensor 14 is a simple voltage divider connected to any unregulated low voltage source on power board 2, coupled to an analog-to-digital converter on power board 2, for the purpose of making an estimate of the relative voltage across L1 and L2.

Current sensor 15 is a torrid coil with well known associated circuiting, inductively coupled to L1 and providing an input to an analog-to-digital converter on power board 2, for the purpose of making an estimate of the relative current through L1.

Self-test program 20 is a unique sequence of user-activated instructions written into the regular control panel 1 program that individually activates pump 3, pump 4, blower 5, light 6, ozonator 7, and heater 8 while recording responses and performance data from voltage sensor 14, current sensor 15, flow sensor 9, water temp sensor 10, heater temp sensor 11, PH sensor 12, and ORP sensor 13. Since self test program 20 is used only in control conditions, it may turn the loads on and off in a non-operational sequence. For example, the heater can be turned on briefly without the normal requirement of water flow from a pump.

Self-test program 20 also contains logic programming used to analyze all performance data and reach a conclusion about the performance of each tested component. To continue with an earlier example, suppose at the end of a self-test sequence the pressure switch (used as a flow sensor) failed to register closed when the appropriate pump (say pump 3) was turned on for a few seconds. Instead of simply presenting an error message of, "FLO", the logic programming would also examine the change in line current, as seen by current sensor 15, at the moment pump 3 was turned on, the change in temperature at water sensor 10 and/or heater sensor 11 over a controlled period of time to see if pump 3 was actually moving water (a temperature profile test), and the slight change in line voltage, as seen at voltage sensor 14, when pump 3 is first turned on. If the results from flow sensor 9, current sensor 15 and voltage sensor 14 are all negative, pump 3 must not be running. If the result from flow sensor 9 is negative but voltage sensor 14 or current sensor 15 reports positive, then flow sensor 9 may be defective. A flow sensor 9 replacement suggestion will be made only after actual water flow can be proven by a temperature profile test using water temp 10, heater temp 11, and heater 8.

The object of the self-test sequence and logical analysis is to reach a conclusion about the condition of a component, good or bad, by using two or more sources of corroborating data. Then, once a good condition of a certain component has been established, that knowledge can weigh heavily in deciding the condition of other components. This process is called the process of elimination. In cases where two or more components could be the cause of certain performance problems, the relative failure rates may be considered in making a replacement recommendation.

The results of self-test program 20 can be indicated in a number of ways Written instructions or graphics can be shown on a reporting means such as a display, which maybe a part of control panel 1 or power circuit board 2. A series of LED indicators can be placed anywhere in the spa to show the required replacement, for another example.

Likewise, self-test program 20 can be initiated in a number of ways. A certain switch input from control panel 1 could start the self-test sequence. Also, a negative input from one of the sensors during a normal operation of the spa could automatically start the sequence and indicate the required action.

Other important ways to utilize self-test program 20 involve pc interface 16. This component serves as a translator between the digital language of the electric spa control (such as SPI or 12C) and the digital language (such as RS232 or USB) of a personal computer, local pc 17. An example would be for self-test program 20 to send all of the previously described performance and sensor data to pc interface 16. PC interface 16 would then relay this data and receive other data from local pc 17.

Programming within local pc 17 could create an easy means for communicating with the spa, for example, an image could be presented on the display of local pc 17 that looks like spa control panel 1, including the display characters and graphics normally seen at control panel 1. A mouse or touch screen at local pc 17 could then be used to activate switches on virtual control panel 21 with the same effects as would be seen from control panel 1 activations.

Local pc 17 also has the ability to display additional information about the spa, including voltages, currents, temperatures, and the state of timers not normally seen on control panel 1.

Local pc 17 can also interface with other users of the Maintenance Support System at remote pc 18, in any location in the world, by means of network 19, which could be a local area network (wired or wireless), a wide area network, or the world wide web. Users of remote pc 18 would have the same access to spa information and activation as someone at local pc 17 or control panel 1, by using virtual control panel 22 and performance data 24, provided by the programming within remote pc 18.

While the preferred embodiment describes the Maintenance Support System as used in a spa, the present invention would be just as useful for monitoring and maintaining swimming pools, industrial equipment, or anywhere that a complex electrical apparatus is difficult to analyze and repair.

Self-test program 20 may be included in power circuit board 2 or other places in the apparatus to be tested. It may be easiest to implement when it is included in the main control program of a microprocessor in a spa. Self-test program 20 may take many forms and programming of the virtual control panels may be accomplished in different ways by those skilled in the art of programming without changing the value of the present invention.

What is claimed is:

1. A maintenance support system for an electrical apparatus, comprising:
   power switching means connected between a source of electrical power and one or more electrical loads;
   computer means connected to said power switching means;
   reporting means connected to said computer means;
   sensing means connected to said computer means and responsible to said electrical loads;
   said computer means further comprising program means which causes said power switching means to selectively energize and de-energize said electrical loads creating different responses in said sensor means, said program means having been designed to analyze said responses and indicate defective components of said apparatus through said reporting means.

2. The system of claim 1, wherein said sensing means includes a current sensor.

3. The system of claim 1, wherein said sensing means includes a voltage sensor.

4. The system of claim 1, wherein said program means causes said loads to be energized and de-energized in a non-operational sequence.

5. The system of claim 1, wherein said program means further comprises failure analysis logic.

6. The system of claim 5, wherein said failure analysis logic uses a process of elimination to find said defective components.

7. The system of claim 5, wherein said failure analysis logic considers relative failure rates in reporting said defective components.

8. The system of claim 1, wherein said reporting means is a display means in said apparatus.

9. The system of claim 1, further comprising interface means to a personal computer.

10. The system of claim 9, further comprising network means connected between said personal computer and a remote personal computer.

11. The system of claim 1, wherein said apparatus is a spa.

12. The system of claim 11, wherein said computer means is a microprocessor in said spa.

13. The system of claim 11, wherein said power switching means is a power circuit board in a spa.

14. A method of analyzing an electrical apparatus for the purpose of identifying defective components of said apparatus, including the steps of:
   (a) collecting performance data from said apparatus when one or more of said components are in a first state of operation;
   (b) collecting additional performance data from said apparatus when one or more of said components are in a second state of operation;
   (c) comparing said performance data and said additional performance data from said apparatus;
   (d) using a logical process to determine from said comparisons which of said components are defective.

15. The method of claim 14, wherein said performance data includes electrical current measurements made when one or more of said components are de-energized and said additional performance data includes additional electrical current measurements made when one or more of said components are energized.

16. The method of claim 14, wherein said logical process considers relative failure rates.

17. The method of claim 14, wherein said defective components are identified on a display means which is a part of said apparatus.

18. The method of claim 14, wherein said defective components are identified on the display of a computer which is coupled to said apparatus through an interface means.

19. The method of claim 18, wherein said defective components are identified on the display of a second computer coupled to said computer through a network means.

20. The method claim 15, wherein said apparatus is a spa.

* * * * *